United States Patent
Weston et al.

(10) Patent No.: US 6,700,623 B1
(45) Date of Patent: Mar. 2, 2004

(54) VIDEO SIGNAL PROCESSING USING TRIPLETS OF PIXELS

(75) Inventors: Martin Weston, Petersfield (GB); William Beningfield Collis, Southampton (GB)

(73) Assignee: Snell & Wilcox Limited, Middlesex (GB)

( * ) Notice: Subject to any disclaimer, the term of this patent is extended or adjusted under 35 U.S.C. 154(b) by 0 days.

(21) Appl. No.: 09/581,045

(22) PCT Filed: Dec. 10, 1998

(86) PCT No.: PCT/GB98/03691

§ 371 (c)(1),
(2), (4) Date: Jul. 26, 2000

(87) PCT Pub. No.: WO99/30490

PCT Pub. Date: Jun. 17, 1999

(51) Int. Cl.[7] .............................. H04N 5/21; H04N 7/01
(52) U.S. Cl. ....................... 348/448; 348/459; 348/618; 348/607
(58) Field of Search ................................. 348/448, 458, 348/459, 441, 607, 618, 619, 620, 621; 382/260, 261, 262; H04N 5/21, 7/01, 11/20

(56) References Cited

U.S. PATENT DOCUMENTS

| 5,086,488 A | 2/1992 | Kato et al. |
| 5,142,380 A | 8/1992 | Sakagami et al. |
| 5,226,114 A | 7/1993 | Martinez et al. |
| 5,249,053 A | 9/1993 | Jain |
| 5,438,625 A | 8/1995 | Klippel |
| 5,512,956 A | 4/1996 | Yan |
| 5,519,647 A | 5/1996 | DeVille |
| 5,621,470 A | 4/1997 | Sid-Ahmed |
| 5,629,779 A | 5/1997 | Jeon |
| 5,642,115 A | 6/1997 | Chen |
| 5,671,298 A * | 9/1997 | Markandey et al. ........ 382/260 |
| 5,748,245 A | 5/1998 | Shimizu et al. |
| 5,802,218 A | 9/1998 | Brailean |
| 5,812,197 A | 9/1998 | Chan et al. |
| 5,831,688 A | 11/1998 | Yamada et al. |
| 5,930,398 A | 7/1999 | Watney |
| 5,991,456 A * | 11/1999 | Rahman et al. ............. 382/260 |
| 6,005,952 A | 12/1999 | Klippel |
| 6,151,362 A | 11/2000 | Wang |
| 6,163,573 A | 12/2000 | Mihara |
| 6,269,120 B1 | 7/2001 | Boice et al. |
| 6,278,735 B1 | 8/2001 | Mohsenian |
| 6,285,716 B1 | 9/2001 | Knee et al. |
| 6,437,827 B1 | 8/2002 | Baudouin |
| 6,539,120 B1 | 3/2003 | Sita et al. |
| 6,570,922 B1 | 5/2003 | Wang et al. |
| 2001/0031009 A1 | 10/2001 | Knee et al. |

FOREIGN PATENT DOCUMENTS

| EP | 0 651 577 A3 | 5/1996 |
| WO | WO 97/01929 | 1/1997 |
| WO | WO 97/16923 | 5/1997 |

OTHER PUBLICATIONS

Patent Abstracts of Japan, Publication No. 60096979, Publication Date May 30, 1985, Applicant Sony Corp.
G. Strang; Linear Algebra and Its Applications; pp. 111–121; paragraph 3.2 Projections onto Subspaces and Least Square Approximations; Academic Press, Inc.; 2nd edition; New York, US.

* cited by examiner

*Primary Examiner*—Sherrie Hsia
(74) *Attorney, Agent, or Firm*—Michael Best & Friedrich LLP

(57) ABSTRACT

A de-interlacing process takes a weighted sum of pixels in a filter aperture to generate a pixel in an output picture, the weighted sum including products of triplets of pixels. Using a training sequence of progressive material, it is possible to calculate the weighting coefficients necessary to minimize the mean square error between the filter output and the desired result.

19 Claims, 3 Drawing Sheets

Output of non-linear filter: $y_n = y\_lin_n + y\_quad_n + y\_cub_n$

```
        X

X
        O
        X

X
4 pixel aperture

X

X   X   X
        O
        X

X
6 pixel aperture

X

X   X   X
        O
X       X       X

X
8 pixel aperture

X   X   X
  X X X X X X X
        O
  X X X X X X X
      X   X   X
20 pixel aperture
```

Figure 4

VIDEO SIGNAL PROCESSING USING TRIPLETS OF PIXELS

FIELD OF THE INVENTION

This invention relates to video signal processing and especially to processes of interpolation, particularly spatial interpolation, whether horizontal, vertical or two dimensional. The invention applies in an important example to the process of de-interlacing by which a video frame is derived for each field of an interlaced video signal.

BACKGROUND

A known de-interlacing technique derives the "missing" lines through a weighted sum of neighbouring sample points. The location of the sample points to be employed and the values of the weighting coefficients are chosen to minimise visual artefacts and certain design principles have been established.

Adaptive techniques have emerged by which the characteristics of the de-interlacing filter are changed in the face of—for example—motion.

SUMMARY OF THE INVENTION

It is an object of aspects of the present invention to provide improved video signal processing by which the appearance of visual artefacts on spatial interpolation is further minimised.

It is a further object of one aspect of the present invention to provide improved video signal processing by which a video frame is derived for each field of an interlaced video signal.

Accordingly, the present invention consists in one aspect in a video process wherein a weighted sum of pixels from at least one input picture is taken in a filter aperture to generate a pixel in an output picture, characterised in that the weighted sum includes products of triplets of pixels.

Suitably, a video frame is derived through spatial interpolation from each video field of an interlaced input signal.

In one form of the invention, the weighted sum comprises pixels and products of triplets of pixels.

In another aspect, the present invention consists in a video process of interpolation, wherein adaption is provided between a process of spatial interpolation in which a weighted sum of products of pixels from an input picture is taken in a filter aperture to generate a pixel in an output picture, and a process of temporal interpolation which a weighted sum of pixels from two or more input pictures is taken in a filter aperture to generate a pixel in an output picture.

In yet another aspect, the present invention consists in video signal processing apparatus for interpolation, comprising an interpolation filter taking a weighted sum of pixels from at least one input picture in a filter aperture, to generate a pixel in an output picture, characterised in that the weighted sum includes products of triplets of pixels.

BRIEF DESCRIPTION OF THE DRAWINGS

This invention will now be described by way of example with reference to the accompanying drawings, in which:

FIG. 4 is a series of diagrams illustrating filter apertures for use in the present invention;

DETAILED DESCRIPTION

In one embodiment of this invention, the aim is to interpolate one field of a video frame from another. This is known as de-interlacing.

Figure 1:
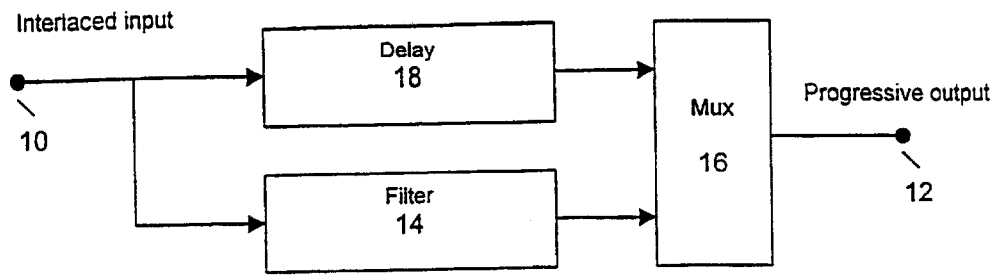
FIG. 1 is a diagram of a de-interlacing circuit according to the present invention.

There is shown in FIG. 1, a de-interlacing circuit in which an interlaced video signal at input terminal 10 is operated upon to form a progressive signal at output terminal 12. A filter 14 receives one field of a video frame and from it interpolates the other field of the frame. A multiplexer 16 receives these "new" fields, as well as the original fields (appropriately delayed at 18). The output of the multiplexer is a progressive scan video signal.

In a traditional de-interlacing circuit, the filter 14 is linear, each filter tap (derived by appropriate delay elements from the input video) is multiplied by a filter weight and the resulting products are summed to give the filter output. In contrast, the present invention proposes a polynomial non-linear filter. This includes, in addition to the linear terms, the sum of filter coefficients multiplied by products of pixel values, triplets of pixel values, etc. For example, a four tap filter for use in the present invention will contain four filter coefficients which are multiplied by single pixel values, ten filter coefficients which are multiplied by products of pixel values, twenty filter coefficients which are multiplied by triplets of pixel values, etc.

In any practical embodiment, the polynomial series must be truncated at some point. A filter truncated at the third order is convenient and there is shown diagrammatically in FIG. 2, a four tap third order filter for use as filter 14 of FIG. 1. The polynomial filter is illustrated graphically as the combination of a linear filter 100, a quadratic filter 102 and a cubic filter 103. The linear filter utilises three delay elements 104 to generate four taps from the input signal. Each tap is multiplied by a coefficient in a respective multiplier 105 and a weighted sum generated in summing device 106. In the quadratic filter 102, similar delay elements 114 provide four taps from the input video signal and ten multipliers 115 generate all ten possible products, again weighted by respective coefficients. A sum is formed in summing device 116. The cubic filter has twenty multipliers 125 operating on the taps from delay elements 124 to generate all possible combinations of triplets of taps and a weighted sum is formed in summing device 126. Although the delay elements 104, 114 and 124 have been shown separately in the three filters, one set of delay elements would usually suffice.

Figure 3:
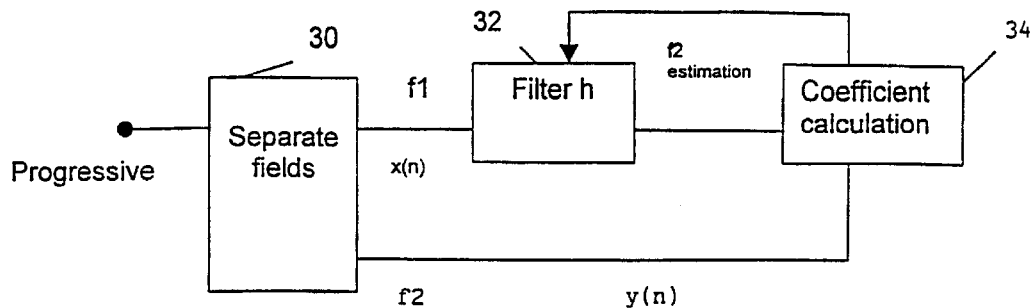
FIG. 3 is a diagram illustrating a process for designing a filter according to the present invention.

It will be understood that in any practical circuit there are very many ways of embodying the described filter. Typically, a single processing element will receive the four taps and with appropriate multipliers, coefficient stores and one or more summing devices, output directly the sum of the linear, quadratic and To understand the technique of constructing a filter according to the present invention, it is helpful to look at FIG. 3. The object is to design an N point digital finite impulse response filter, h, to modify the input, x(n), in such a way as to minimise the mean square error, e(n), between the filter output and the desired signal, y(n). In the case of de-interlacing, x(n) is field f1, and y(n) is field f2. The aim is to create a filter h(n) that when operated on f1, gives the best possible estimate of f2 such that the mean squared error between the estimate of f2 and actual f2 is minimised. In FIG. 3, a progressive input is proved to block 30 which separates the fields of a video frame and outputs field f1 and field f2. Field f1, that is to say x(n) is provided to the filter 32 to generate an estimate of f2. This is then compared in block 34 with the actual f2, that is to say y(n).

The filter impulse response which minimises the sum of the squared errors of data of length L, is given by the solution of the over-determined (assuming L>N) system of equations $Xh = y$ where $$X = \begin{bmatrix} x(L) & x(L-1) & \cdots & x(L-N+1) \\ x(L-1) & x(L-2) & \cdots & x(L-N) \\ \vdots & \vdots & & \vdots \\ x(2) & x(1) & \cdots & 0 \\ x(1) & 0 & \cdots & 0 \end{bmatrix} \text{ and}$$

$$y = \begin{bmatrix} y(L) \\ y(L-1) \\ \vdots \\ y(2) \\ y(1) \end{bmatrix}.$$

the least squares solution of which is, $$h = (X^T X)^{-1} X^T Y.$$

where $X^T X = R$ is known as the auto-correlation matrix and $X^T y = p$ is known as he cross correlation vector. Note $X^T X$ and $X^T y$ are usually much smaller than X. Hence, it is much more efficient to compute $X^T X$ and $X^T y$ directly from x(n) and (n) rather than to form X.

The extension of this to a more general non-linear model is in principle simply a matter of modifying the data matrix X. Below we show the data matrix for a second order polynomial non-linear filter, in which a constant (DC) term has also been included. A symmetric form for the non-linear components of the filter has been assumed so this matrix has dimension $$L \times \left( N + \frac{N(N+1)}{2} \right).$$

$$X = \begin{bmatrix} 1 & x(L) & x(L-1) & \cdots & x(L-N+1) & x(L)^2 & x(L)x(L-1) & \cdots & x(L)x(L-N+1) & x(L-1)^2 & \cdots & x(L-N+1)^2 \\ 1 & x(L-1) & x(L-2) & \cdots & x(L-N) & x(L-1)^2 & x(L-1)x(L-2) & \cdots & x(L-1)x(L-N) & x(L-2)^2 & \cdots & x(L-N)^2 \\ 1 & x(L-2) & x(L-3) & \cdots & x(L-N-1) & x(L-2)^2 & x(L-2)x(L-3) & \cdots & x(L-1)x(L-N-1) & x(L-3)^2 & \cdots & x(L-N-1)^2 \\ \vdots & \vdots & \vdots & & \vdots & \vdots & \vdots & & \vdots & \vdots & & \vdots \\ 1 & x(3) & x(2) & \cdots & 0 & x(3)^2 & x(3)x(2) & \cdots & 0 & x(2)^2 & \cdots & 0 \\ 1 & x(2) & x(1) & \cdots & 0 & x(2)^2 & x(2)x(1) & \cdots & 0 & x(1)^2 & \cdots & 0 \\ 1 & x(1) & 0 & \cdots & 0 & x(1)^2 & 0 & \cdots & 0 & 0 & \cdots & 0 \end{bmatrix}$$

The optimal filter, in the least squares sense, can then be estimated by solving $h = R^{-1}p$. The filter will contain three separate components; the DC term, the standard linear coefficients which should be multiplied by single pixel values, and the quadratic coefficients which will be multiplied by product of pixel values.

The present invention recognises that if the mean square error is chosen for optimisation of the filter, it is possible to calculate the filter coefficients h without forming a trial filter and iterating. The training process then represents not an iterative improvement in a trial or prototype filter, but the collection of sufficient data from real picture material for which both x and y are known, to enable calculation of meaningful auto-correlation matrix and cross correlation vector.

A polynomial model truncated at the third order is preferred according to this invention. This will contain linear, quadratic, and cubic filters and so is able to model systems which contain both quadratic and cubic non-linear elements. These generate both skewed and symmetric distortions of the probability density function. Higher order models can be used and are shown to give improved results but the size of the filter and the computation required in its estimation rise exponentially and there are rapidly diminishing returns. For example, the fifth order, six pixel cubic non-linear filter does perform better than the third order, six pixel filter but there are over five times as many terms.

For the linear case, it is found that neither increasing the number of taps in the vertical direction, of a six point vertical filter nor utilising pixels in the horizontal direction, significantly reduces the mean squared error. However, for a filter according to the present invention, the choice of aperture has much more dramatic results. For example, a two dimensional aperture does give a significant improvement over a one dimensional one. This is thought to be due to the ability of the non-linear filter to deal with sloping edges and lines and utilise gradient information.

However, as can be seen in Table 1, the number of filter coefficients rises exponentially with the number of pixels. Due to computational constraints a sensible maximum size is presently taken for a cubic filter of 20 pixels and for a fifth order filter, 6 pixels.

Total number of filter coefficients for third and fifth order non-linear filters containing 4,6,8,12 and 20 pixels.

| | Number of filter coefficients | |
|---|---|---|
| No. of pixels | Third order non-linear filter | Fifth order non-linear filter |
| 4 | 35 | 126 |
| 6 | 84 | 462 |
| 8 | 165 | 1287 |
| 12 | 445 | 6178 |
| 20 | 1770 | 53129 |

As the number of pixels available is limited it is important to choose the correct shape of aperture. Best results seem to occur from apertures that contain four vertical pixels and then a number of horizontal pixels. The apertures used for the 4, 6, 8 and 20 pixel filters are shown in FIG. 4 (X denotes the pixels used in field, f1, to estimate the pixel denoted by O in field, f2). The use of horizontal information helps to cope with the near horizontal lines and edges that often cause problems due to jagging in de-interlacing.

Table 2 shows the mean squared error between the estimated field and actual field for a particular reference picture, for a series of different filters. It can be seen that in all cases, the non-linear filters perform better than standard linear filters.

TABLE 2

Mean squared errors for various filters used on EBU reference picture "Girl".

| Filter type | Mean squared error between the estimate of the field and the actual field | Number of coefficients in filter |
|---|---|---|
| 2 pixel linear filter (0.5/0.5) | 23.15 | 2 |
| 4 pixel linear filter (optimum) | 18.61 | 4 |
| 8 pixel linear filter (optimum) | 18.58 | 8 |
| 36 pixel linear filter (optimum) | 18.55 | 36 |
| 4 pixel cubic filter (optimum) | 16.14 | 35 |
| 6 pixel cubic filter (optimum) | 15.67 | 84 |
| 6 pixel fifth order filter (optimum) | 14.88 | 462 |
| 8 pixel cubic filter (optimum) | 15.21 | 165 |
| 12 pixel cubic filter (optimum) | 14.69 | 445 |
| 20 pixel cubic filter (optimum) | 13.50 | 1770 |

It is found that the non-linear filter produces much smoother edges and curves than its linear counterpart, with reduced jagging.

Finally, the mean square error is given for a series of pictures for a linear, and two non-linear filters, (Table 3). It can be seen that in all cases the non-linear filters perform as well as or better than the linear filters.

TABLE 3

Mean squared error for standard EBU pictures

| Picture | Error for 4 pixel linear | Error for 4 pixel cubic | Error for 12 pixel cubic |
|---|---|---|---|
| Blackboard | 49 | 43 | 43 |
| Boats | 73 | 67 | 66 |
| Boy | 73 | 64 | 57 |
| Clown | 23 | 20 | 20 |
| Girl | 19 | 17 | 17 |
| Pond | 166 | 153 | 140 |
| Tree | 313 | 303 | 303 |
| couple | 91 | 87 | 86 |
| Kiel | 135 | 128 | 128 |
| Latin | 363 | 289 | 234 |

Non-linear polynomial filters in accordance with the present invention can give dramatically improved performance over conventional linear predictors when used for spatial de-interlacing. Polynomial non-linear filters are generally more complex than their linear equivalents, although only using spatial information reduces the complexity significantly as compared to conventional spatio-temporal filters. The increased performance seems to occur mainly along edges; whereas linear filters often produce jagging on diagonal lines and curves, the nonlinear filters described here considerably reduce such artifacts.

A non-linear filter for use in the present invention can be implemented directly as a set of multipliers and an adder as so far described or the same charateristic can be achieved using a lookup table.

A de-interlacing circuit can operate independently or the de-interlacing function can be incorporated within a circuit operating on an interlaced signal for the purposes of standards conversion, upconversion, downconversion, aspect ratio conversion, digital video effects and so on.

Figure 5:
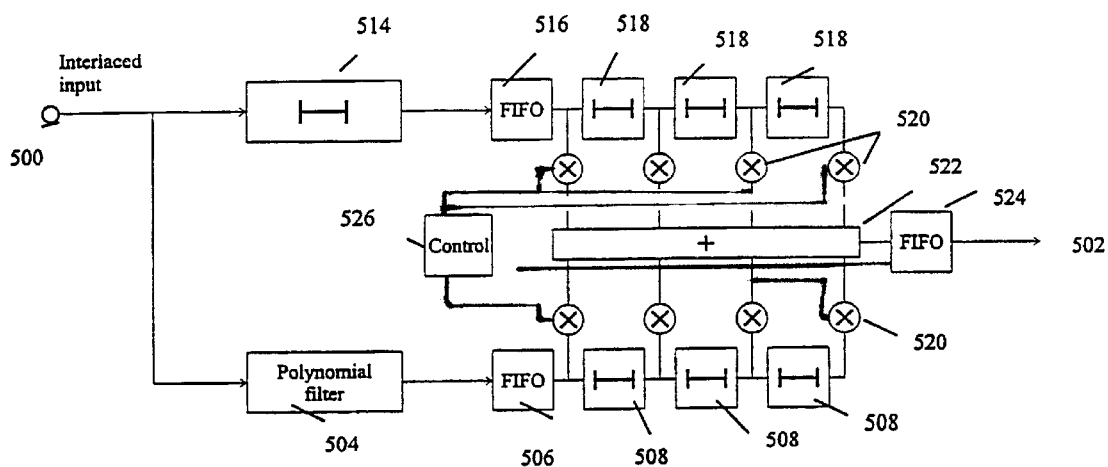
FIG. 5 is a diagram of an interpolating circuit according to one embodiment of the present invention.

Thus, turning to FIG. 5, there is shown a circuit which operates on an interlaced video signal received at input terminal 500 to provide through interpolation an output video signal at terminal 502. This may be an interlace or a progressive signal and may have different numbers of lines per field, different numbers of fields per second and so on, depending upon the specific function of the circuit. One example would be an interlaced output in a different television broadcast standard to the input.

Figure 2:
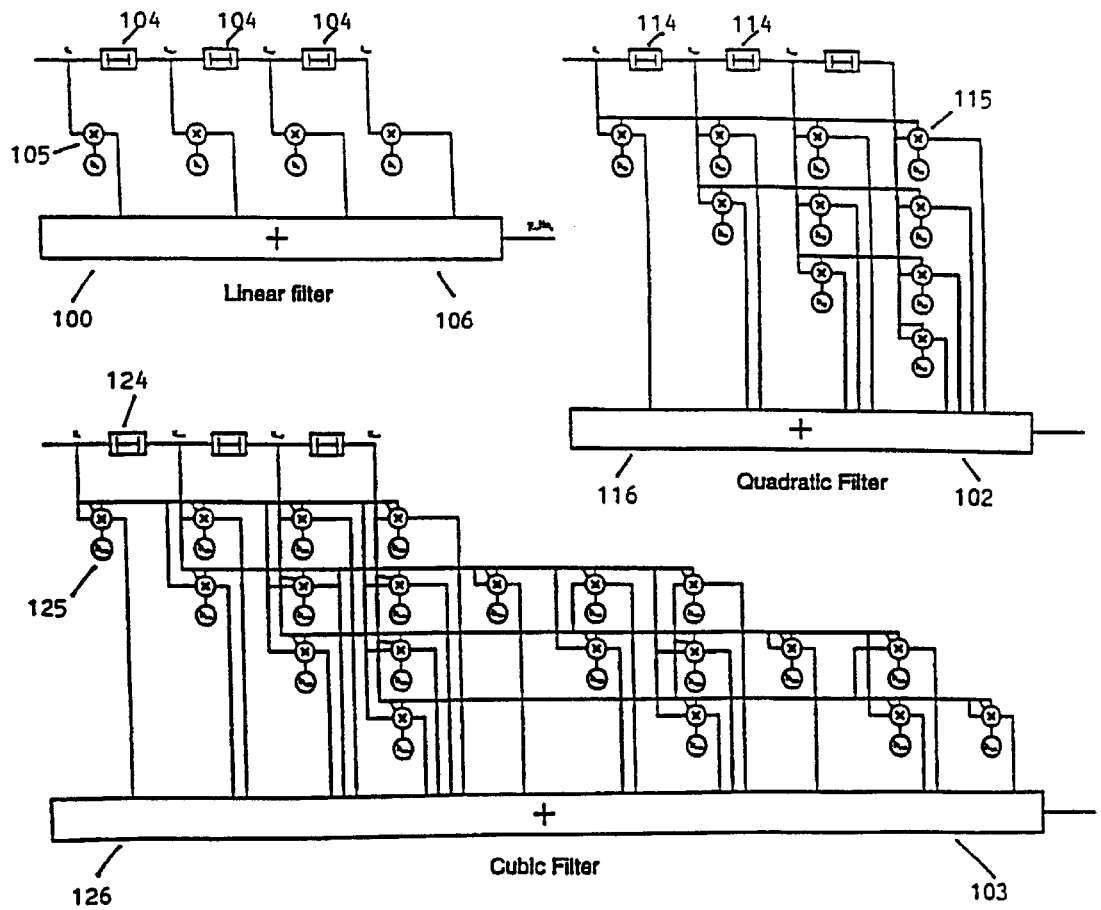
FIG. 2 is a diagrammatical representation of a four tap third order filter useful in accordance with the present invention.

The input signal of FIG. 5 is passed to a polynomial filter 504 that in one example takes the form illustrated symbolically in FIG. 2. The output of filter 504, comprising the "new" fields, passes through a FIFO 506 to a series chain of delay elements 508. The original fields are taken through a delay 514 to a similar FIFO 516 and delay elements 518.

A weighted sum of the filter taps generated by the delay elements 508 and 518 is taken by means of multipliers 520 and summing device 522. The output of the summing device 522 is taken through a FIFO 524, to the output terminal. The coefficients of the multipliers are set through control unit 526, which also serves to control the rates at which data is read into and read out of the FIFO's 506, 516 and 524.

The skilled man will recognize that through appropriate choice of the delay elements and control of the FIFO's and multipliers, a wide variety of interpolation procedures can be conducted.

Figure 6:
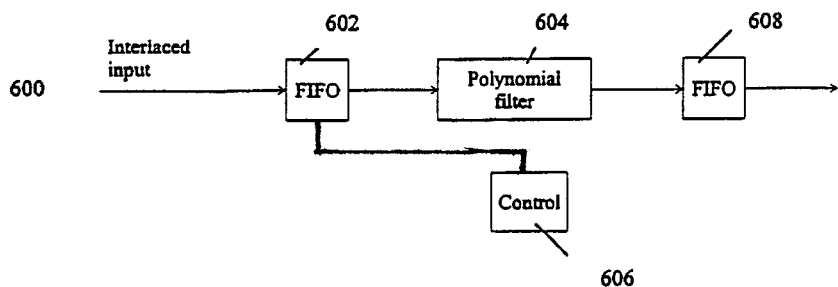
FIG. 6 is a diagram of an interpolating circuit according to a further embodiment of the present invention.

In another arrangement, the interpolation process is "folded into" the polynomial filter. Thus as shown in FIG. 6, an interpolating circuit has the interlaced video input signal at terminal 600 passing through FIFO 602 to a polynomial filter 604. This may be of the same general form as FIG. 2 but with each of the multipliers receiving its multiplication coefficient dynamically from a control unit 606. The output of the filter 604 passes through a further FIFO 608 with the control unit 606 controlling the rates at which data is read into and read out of the FIFO's 602 and 608.

In still a further modification, selecting at least some of the delay elements of the filter to be field delays rather than pixel or line delays, a temporal interpolator can be produced. It is known that the performance of a de-interlacer can be improved for still material by employing temporal interpolation. It is then necessary to detect motion and to adapt or switch on detection of motion from temporal interpolation. This motion adaption is preferably conducted With prior art techniques, this switching or adaptation produces adaption artefacts that can be visually disturbing. It is found that by using a spatial interpolator according to the present invention, and preferably also a temporal interpolator using a similar polynomial filter, the visibility of adaption artefacts is considerably reduced. It is believed that the described non-linear behaviour of an interpolator according to the present invention provides a "fine" adaption, inasmuch as the value of a pixel in a product of two pixels can be regarded as varying the multiplication coefficient applied to the other pixel. Adaption in the conventional sense from temporal to spatial interpolation can in this sense be regarded as "coarse" adaption. Taking numerals as an illustration, coarse adaption might be regarded as switching from +5 to −5, which is a step large enough to produce switching artefacts. Consider now that the two values of +5 and −5 are both subject to fine adaption in the range 0,1,2,3,4,5,6,7,8,9 in the case of the +5 value, and −9,−8,−7,−6,−5,−4,−3,−2−1,0 in the case of the −5 value. Now, in face of a tendency dictating a switch from +5 to −5, it is to be expected that fine adaption will have occurred in the +5 value towards 0, thus minimising the switch step. If the −5 value has similarly undergone fine adaption towards 0, the step will be further reduced.

Whilst an important example, de-interlacing is not the only application for apparatus according to the present invention. It may be more regarded as useful with an input video signal which is undersampled, de-interlacing being then only one example.

What is claimed is:

1. A video process comprising the steps of taking a weighted sum of pixels from at least one input picture in a filter aperture, and using said weighted sum to generate a pixel in an output picture, characterised in that the weighted sum includes products of triplets of pixels, said products of triplets of pixels comprising the multiplicative product of three pixels multiplied by each other.

2. A video process according to claim 1, in which spatial interpolation is conducted.

3. A video process according to claim 2, in which a video frame is derived through spatial interpolation from each video field of an interlaced input signal.

4. A video process according to claim 1, wherein the weighted sum comprises pixels and products of triplets of pixels.

5. A video process of interpolation comprising a process step of spatial interpolation in which a weighted sum of products of pixels multiplied by each other from an input picture is taken in a filter aperture to generate a pixel in an output picture, an adaption step of switching between spatial interpolation and temporal interpolation, and a process step of temporal interpolation in which a weighted sum of pixels from two or more input pictures is taken in a filter aperture to generate a pixel in an output picture.

6. A video process according to claim 5, wherein said spatial interpolation takes a weighted sum of products of triplets of pixels from said input picture.

7. A video process according to claim 5, wherein said temporal interpolation takes a weighted sum of products of pixels from two or more input pictures.

8. A video process according to claim 7, wherein said temporal interpolation takes a weighted sum of products of triplets of pixels from two or more input pictures.

9. A video process according to claim 5, in which said adaption step is performed in response to motion.

10. A video process according to claim 9, wherein said adaption step is performed substantially pixel by pixel.

11. Video signal processing apparatus for interpolation, comprising an interpolation filter taking a weighted sum of pixels from at least one input picture in a filter aperture, to generate a pixel in an output picture, characterised in that the weighted sum includes products of triplets of pixels, said products of triplets of pixels comprising the multiplicative product of three pixels multiplied by each other.

12. Video signal processing apparatus according to claim 11, wherein said triplets of pixels are from the same picture.

13. Video signal processing apparatus according to claim 11, wherein the filter is continuously in circuit, during operation of the apparatus.

14. A video process of interpolation, having training and interpolating modes, comprising the steps of:
    in the training mode, inputting into a video signal processing apparatus having a weighted filter, an undersampled picture from which a known desired picture to be interpolated, and optimising the filter weightings of the weighted filter to minimise an error between said known picture and an output of the video signal processing apparatus; and
    in an interpolating mode, operating the filter with optimised parameters on an input signal.

15. A process according to claim 14, wherein the error that is minimised is a mean square error.

16. An interpolating filter employing weighting coefficients h, operating on an undersampled video signal x, there being correctly sampled information available for at least a training sequence of x to generate the desired result y of an interpolation process on x, the filter taking weighted sums of products of N pixels multiplied by each other in a filter aperture; the coefficients h employed in the weighting being derived according to $h=(X^TX)^{-1}X^Ty$ where X is the matrix of N pixels of the signal x over the training sequence.

17. A filter according to claim 16, wherein the matrix X includes products of pairs of pixels.

18. A filter according to claim 16, wherein the matrix X includes products of triplets of pixels.

19. A method of processing video information, the method comprising:
    spatially interpolating an input picture taken in a filter aperture by multiplying a weighted sum of products of pixels by each other to generate a pixel in an output picture;
    switching between spatial interpolation and temporal interpolation; and
    temporally interpolating a weighted sum of pixels from two or more input pictures taken in a filter aperture to generate a pixel in an output picture.

* * * * *

UNITED STATES PATENT AND TRADEMARK OFFICE
CERTIFICATE OF CORRECTION

PATENT NO.    : 6,700,623 B1
DATED         : March 2, 2004
INVENTOR(S)   : Martin Weston and William Beningfield Collis It is certified that error appears in the above-identified patent and that said Letters Patent is hereby corrected as shown below:

Column 8,
Line 6, should read -- be interpolated, and optimising filter weightings of --

Signed and Sealed this

Twenty-ninth Day of June, 2004

JON W. DUDAS
*Acting Director of the United States Patent and Trademark Office*